United States Patent [19] [11] 4,256,795
Day et al. [45] Mar. 17, 1981

[54] HEAT TRANSFERS

[75] Inventors: Ian H. Day, Southall; William A. Baldwin; Harold J. Stern, both of London, all of England

[73] Assignee: Polymark Corporation, Cincinnati, Ohio

[21] Appl. No.: 801,275

[22] Filed: May 27, 1977

Related U.S. Application Data

[63] Continuation-in-part of Ser. No. 627,730, Nov. 24, 1975, abandoned.

[30] Foreign Application Priority Data

Nov. 5, 1974 [GB] United Kingdom ............... 47867/74

[51] Int. Cl.$^3$ ............................................. B32B 3/00
[52] U.S. Cl. .................................. 428/196; 428/202; 428/207; 428/212; 428/913; 428/914; 428/423.3; 525/440; 525/443; 525/456; 528/48; 528/51; 528/52; 528/73
[58] Field of Search ............... 428/425, 349, 352, 355, 428/914, 200, 201, 202, 424, 913, 207, 212, 196; 156/331, 230, 240; 260/75 NH, 75 NP, 75 NM, 77.5 AN, 77.5 AM, 849, 858; 525/440, 443, 456; 528/48, 51, 52, 73

[56] References Cited

U.S. PATENT DOCUMENTS

| 2,871,218 | 1/1959 | Schollenberger | 260/75 NP |
| 3,359,127 | 12/1967 | Meyer et al. | 428/200 |
| 3,490,987 | 1/1970 | Bauriedel | 428/425 X |
| 3,503,934 | 3/1970 | Chilvers | 156/331 X |
| 3,542,718 | 11/1970 | Davis et al. | 260/849 X |
| 3,595,739 | 7/1971 | Meyer | 428/349 X |
| 3,626,023 | 12/1971 | Brizgys | 260/849 X |
| 3,806,486 | 4/1974 | Endriss et al. | 156/331 X |
| 3,912,680 | 10/1975 | Oertel et al. | 156/230 X |
| 3,920,499 | 11/1975 | Day et al. | 428/200 X |

FOREIGN PATENT DOCUMENTS

| 849136 | 9/1960 | United Kingdom. |
| 1025970 | 4/1966 | United Kingdom. |
| 1201713 | 8/1970 | United Kingdom. |
| 1287452 | 8/1972 | United Kingdom. |
| 1386392 | 3/1975 | United Kingdom. |

Primary Examiner—John T. Goolkasian
Assistant Examiner—Thomas Bokan
Attorney, Agent, or Firm—John C. Smith, Jr.

[57] ABSTRACT

A heat transfer comprising a temporary support and a label carried on the support. The label comprises a layer of a polyurethane resin system which includes a polyurethane obtained by reaction of a diphenyl isocyanate, a free glycol and a polyester either of the formula

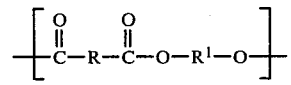

wherein R is an alkylene radical of 2 to 8 carbon atoms and R$^1$ is an alkylene radical of 4 to 10 carbon atoms or of the formula

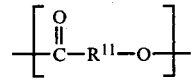

wherein R$^{11}$ is an alkylene radical of 4 to 8 carbon atoms. The polyurethane resin system further includes a cross-linking agent and a catalyst so that when the label is placed in contact with an article to be marked and subjected to heat and pressure, the resin system is converted to an inert insoluble and wear resistant form and a substantially permanent marking is produced on the article.

26 Claims, No Drawings

HEAT TRANSFERS

This application is a continuation-in-part of application Ser. No. 627,730 filed 11-24-75, abandoned.

The present invention relates to heat transfers of the kind used for providing an article especially a textile article, with a decorative and/or informative label, stamp or other marking hereinafter referred to simply as a label.

The Applicants hve previously disclosed various constructions of heat transfer in their British Pat. Nos. 928,347, 1,201,713 and 1,287,452 and 1,386,392. Briefly, such transfers comprise a temporary support and a label, carried by the support, including a resin system which, when placed in contact with an article to be marked and subjected to the action of heat and pressure, is cured into an inert, insoluble and wear resistant form and thus provides a substantially permanent marking on the article surface.

Markings formed from resins systems as described in the above patents suffer from certain limitations which restrict their usefulness. In particular, they are relatively inextensible after cross-linking and require a high application pressure to secure good adhesion to the fabric. There is also a tendency for the resin to crack if it forms an unsupported bridge between fibres of a coarsely woven fabric. Thick fibres, particularly, of materials such as wool, which absorb considerable amounts of water during washing, may also cause the transfer to crack during washing.

These considerations limit the use of those resin systems to transfers which are to be applied to fabrics which are of a closely woven construction such as cotton sheeting; cotton drill; acetate, rayon and nylon linings; cotton, cotton/polyester and nylon shirtings, including warp-knit nylon.

The same limitations are further apparent when one considers that application pressures used in the above patents are of the order of 2 to 4 Kg/sq. cm., as only fabrics which are not crushed by such pressures can be labelled without damage.

Resin systems which are used in the production of a heat transfer must satisfy a number of stringent requirements and in particular they must be soluble in readily available solvents, and they must dry to a firm, non-tacky film which has a long shelf-life, i.e. it will not cross-link at ambient temperatures even though it may already incorporate a cross-linking agent and a catalyst, but will cross-link in a few seconds at the elevated temperature at which marking is carried out. The selected resin system must therefore allow the following manufacturing steps to be carried out:

Preparation of solutions, printing ink etc.;

Printing, drying, stacking and cutting sheets of printed labels;

Dispatch and storage at a range of ambient conditions; and at the time of application and under the selected conditions of heat and pressure, flow into a fabric being marked without blurring of the marking, followed (when in the presence of a cross-linking agent) by cross-linking to a substantially insoluble and wear resistant form.

It is an object of the present invention to provide a heat transfer incorporating a resin system which obviates or mitigates the limitations of the prior art heat transfers, which satisfies the above requirements and which, in addition, is tough, extensible and resistant to cracking, laundering, dry-cleaning, ironing and normal wear and tear.

According to the present invention there is provided a heat transfer comprising a temporary support and a label (as herein defined) carried on said support, said label comprising a layer of a polyurethane resin system including a thermoplastic polyurethane elastomer which is the product of the reaction of (A) 1 mole of an essentially linear hydroxyl terminated polyester either of the formula

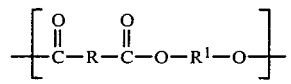

wherein R is an alkylene radical of 2 to 8 carbon atoms and $R^1$ is an alkylene radical of 4 to 10 carbon atoms, or of the formula

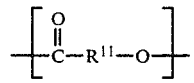

wherein $R^{11}$ is an alkylene radical of 4 to 8 carbon atoms, said linear polyester having an average molecular weight of 600 to 3000 and an acid number less than 10; (B) from 1.1 to 3.1 moles of a diphenyl diisocyanate having an isocyanate group on each phenyl nucleus; and (C) from 0.1 to 2.1 moles of at least one free glycol of from 2 to 10 carbon atoms; the combined average hydroxyl number molecular weight of the polyester and the free glycol being 450 to 1,200, and the molar amount of the polyester and glycol combined being essentially equivalent to the molar amount of the diisocyanate compound, said polyurethane resin system further comprising an acid or acid yielding catalyst and as a cross-linking agent a compound containing at least two N-alkoxymethyl groups, whereby when the layer of the polyurethane resin system is placed in contact with an article to be marked and subjected to heat and pressure the polyurethane is cross-linked into an inert, insoluble and wear resistant form to provide a substantially permanent marking on the article.

The polyesters of the formula

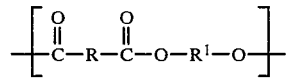

may be prepared by the reaction of a saturated aliphatic glycol having 4 to 10 carbon atoms and the hydroxyl groups on its terminal carbon atoms, and a dicarboxylic acid of the formula HOOC-R-COOH where R is an alkylene radical of 2 to 8 carbon atoms, or the anhydride thereof.

Preferably, the polyester used for producing the polyurethane has 4 to 8 methylene groups per ester group. Examples of polyesters which may be used for preparing the polyurethanes are designated below under the headings A(i)-(v):

A(i) Polyesters prepared from adipic acid and 1,4-butane diol (both R and R' having 4 carbon atoms), and having approximate molecular weights of 600, 1,000, 1200, 2,000, 2,500 or 3,000;

A(ii) Polyesters prepared from succinic acid (R having 2 carbon atoms) and 1,8-octane diol (R' having 8 carbon atoms) and having approximate molecular weights of 1,000 and 2,000;

A(iii) Polyesters prepared from adipic acid and 1,8-octane diol having approximate molecular weights of 1,000 and 2,000;

A(iv) Polyesters prepared from sebacic acid (R having 8 carbon atoms) and 1,8-octane diol and having molecular weights of 1,000 and 2,000; and A(v) Polyesters prepared from caprolactone having molecular weights of approximately 1,000 and 2,000.

The term diphenyl diisocyanate compound as used herein is generic to compounds having two phenyl groups which are bonded either directly to each other or through the intermediary of one or more atoms such as carbon or oxygen, each phenyl group having an -NCO substituent.

Diphenyl methane diisocyanate is found to be particularly suitable for producing the polyurethane resin and for this, and other diphenyl diisocyanate compounds the diphenyl-p,p'-diisocyanate isomer is preferred. Suitable diisocyanates for use in preparing the polyurethanes are listed below:

B(i) 4,4'-diphenylmethane diisocyanate
B(ii) 3,3'-dichloro 4,4'-diphenylmethane diisocyanate
B(iii) 3,3'-dimethyl 4,4'-biphenyl diisocyanate
B(iv) 4,4'-diphenylether diisocyanate
B(v) 3,3'-dimethyl 4,4'-diphenylether diisocyanate
B(vi) 4,4'-diphenyldimethylmethane diisocyanate
B(vii) 4,4'-dibenzyl diisocyanate.

Preferably also the free glycol is a linear glycol of the formula $HO(CH_2)_nOH$, n being 2 to 8. Examples of suitable glycols are designated C(i)-C(v) below:

C(i) ethylene glycol
C(ii) 1,4-butane diol
C(iii) hexylene glycol
C(iv) 1,8-octane diol
C(v) 1,10-decane diol The preferred polyurethanes for use in the invention are those prepared from polyesters having a molecular weight in the range 1200 to 3000, with the combined average hydroxyl number molecular weight of the free glycol and polyester being from 450 to 1200. Such polyurethanes are available under the name Impranil (Registered Trade Mark of Baeyer). Other polyurethanes which may be used are prepared from polyesters which have a molecular weight of 600 to 1200 with the combined average hydroxyl number molecular weight being from 450 to 600. These polyurethanes are described in U.K. Pat. Nos. 849,136 and 1,025,970 and U.S. Pat. No. 2,871,218 and are available under the name Estane (Registered Trade Mark of B. F. Goodrich).

The thermoplastic polyurethane incorporates a cross-linking agent and an acid or acid yielding catalyst so that, under the application conditions, the polyurethane is converted to an inert, insoluble and wear resistant form.

The cross-linking agent used to cure the polyurethane resin under the application conditions is selected such that the resin will not cure during long periods of storage at ambient temperature or at the temperatures encountered in preparing the transfer but, nevertheless, will be rapidly cured at the temperature of transfer application to provide a substantially permanent marking. Suitable cross-linking agents are compounds containing more than one N-alkoxymethyl group, more preferably more than one N-methoxymethyl group, and several specific examples are listed in the following table.

N,N'-bis-(methoxymethyl)uron,
tri-methoxymethyl melamine,
hexa-methoxymethyl melamine,
tetra-methoxymethyl urea,
urea-formaldehyde precondensates containing methoxymethyl groups,
melamine formaldehyde precondensates containing methoxymethyl groups,
hexa-ethoxymethyl melamine,
urea-formaldehyde precondensates containing ethoxymethyl groups,
melamine-formaldehyde precondensates containing ethoxy-methyl groups,
N,N'-bis-(methoxymethyl)-meta-phenylenediamine,
alkylated melamine or urea resin precondensates,
butylated melamine or urea resin precondensates.

The cross-linking agent may be used in an amount of up to 30% by weight based on the weight of the dry resin, with a preferred range of 5-20% by weight.

As catalyst for the cross-linking agent, there is preferably used a non-volatile acid having a pKa value of from 2 to 5, preferably 2.5 to 3.5. Stronger acids tend to induce a significant degree of cross-linking at ambient temperatures thus giving a heat transfer of poor shelf life, and weaker acids do not act sufficiently quickly under the marking conditions.

As examples of suitable acidic curing agents there may be mentioned tartaric acid, phosphoric acid, citric acid, o-phthalic acid, iso-phthalic acid, itaconic acid and salicylic acid. Alternatively, a compound which yields the acid under the marking conditions may be used and in this respect the anhydrides and ammonium salts of the acids may be used.

The amount of acid or acid yielding curing agent required depends on the pKa of the acid, its basicity and its equivalent weight. An amount of curing agent in the range 0.5 to 10% by weight based on the resin weight will normally be found satisfactory and the best results are obtained with a range of 1 to 4% by weight.

Heat transfers in which the polyurethane resin system incorporates a cross-linking agent and acidic catalyst as described above are found to have an excellent shelf life but, under the application conditions, the polyurethane is rapidly cross-linked into an inert, insoluble and wear resistant form and produces a substantially permanent marking which is not removed by laundering, pressing and dry cleaning operations, to which the article may be subjected. However, in spite of the cross-linked structure, the marking is extensible and may be used on such fabrics as knitwear and jersey. Particularly good stretch properties for relatively thin labels are obtained with labels in which the polyurethane has a polyester component with a molecular weight of over 1200 and up to 3000.

Transfer labels prepared according to the present application can also be loosely constructed or bulked fabrics at pressures as low as 0.1 Kg/sq. cm., which means that such fabrics can be labelled without an unsightly pressure mark.

The present application thus extends the range of fabric types which can be successfully labelled to: jersey knitted cotton, wool, nylon etc. including sports shirts, swimwear etc; bulked polyesters, nylons and acrylics as used for ladies dresses, and fabrics with an open weave.

The reduced pressure of application also means that there is a greatly reduced tendency for the label to strike through a single thickness of fabric and show on the other side. Distortion of the fabric in the label area is also reduced.

Heat transfers which are produced from polyurethanes in which the polyester component has a molecular weight of 600 to 1200 are useful in the case where the article to which they are applied is not to be subjected to laundering or is to be subjected only to laundering under mild conditions. This is because high temperature laundering, e.g. hot washing, may cause deterioration and cracking with consequent loss of appearance of the marking, which is of course disadvantageous.

If the article is to be subjected to relatively severe laundering it is advisable that the marking be provided by a heat transfer produced with a polyurethane having a polyester component of molecular weight above 1200 and not more than 3000. Markings produced with such polyurethanes are substantially more resistant to hot washing than those produced from polyurethanes having a polyester component of lower molecular weight and keep their appearance after many such washings.

In addition heat transfers produced with polyurethanes having a polyester component with a molecular weight in the range of above 1200 to 3000 may be more rapidly applied to an article than those with a polyester component having a molecular weight of 600 to 1200 in view of the fact that the former resins are more rapidly cross-linked. Furthermore, the said former resins are subject to less resin flow during the transfer operation and this has the effect that brighter, more opaque colours may be obtained for the applied marking.

Whilst the polyurethanes prepared from polyesters having a molecular weight of over 1200 and up to 3000 are most preferred for use in the invention in view of the excellent properties they impart to the applied label, they do however suffer from the disadvantage that they are difficultly soluble in many common solvents. However they may be dissolved in cyclohexanone with high speed mixing and heat transfers may be prepared in normal manner from such solutions provided that precautions are taken to contain the irritating cyclohexanone vapours.

Several different forms of heat transfer fall within the scope of the present invention and their structure will now be described in more detail.

In all cases, the transfer incorporates a temporary support on which the label is carried and which is removed after the marking operation. The support may consist of a suitable release agent, for example cellulose triacetate either as an unsupported film or laminated or coated to a suitable grade of paper. Alternatively, the support may consist of polyethylene terephthalate in film form, commonly sold under the trade marks MELINEX or MYLAR, either unsupported or laminated to a suitable grade of paper. There are also a number of proprietory release coated papers which may be used.

In one form of transfer, the label is provided by coating the support with a solution of the polyurethane resin system, containing catalysts and curing agents, which is then dried so as to form a continuous layer of resin. Onto this layer is printed, in mirror image form, the required design with an ink preferably comprising the same resin system as that used for the continuous layer and made up typically as an approximately 25% solution in an organic solvent such as a ketone (e.g. cyclohexanone) or mixtures of ketones, alcohols and aromatic hydrocarbons. The ink is pigmented in the normal manner and printing effected by conventional techniques such as screen printing.

When this transfer is applied to an article the continuous layer is uppermost in the applied label and thus forms a protective layer for the printed characters.

Optionally, a second continuous layer of the same or different polyurethane resin as the first continuous layer may be applied to the top of the transfer so as to sandwich the printed characters and form a background layer when the label is applied to the article. If desired, this background layer may be of contrasting colour to the printed characters.

In the case of a three layered structure of this type, it is possible to use conventional printing inks since they will be protected by the two resin layers.

In another type of heat transfer, the required marking of a printing ink based on the polyurethane may be applied directly to the support and then covered with a continuous layer of a polyurethane resin system, and when this continuous layer is pigmented it provides a coloured background for the applied label.

In a still further form of transfer, a marking of one or more individual printed characters or markings based on a polyurethane resin system is applied to the temporary support and this assembly may itself be used as a heat transfer so that the printed characters constitute the label. It is however found that a large amount of pigment must be used in the ink so as to obtain the required intensity of colour and that this deleteriously affects the bonding properties of the label. These difficulties can be overcome by applying to each printed character a substantially coterminous or slightly overlapping layer of polyurethane resin system, preferably clear, to act as a bonding layer. If desired, each printed character may be sandwiched between two such layers so as to provide a bonding layer and a protective layer for the label.

The heat transfers according to the invention are generally used for applying labels to flexible articles and in particular textile materials.

In order to apply the label to the article, the heat-transfer assembly is placed in contact with the article, support surface uppermost, and the assembly is pressed at a pressure of 0.1–4 Kg/cm$^2$ at a temperature of 150°–250° C. for 2–20 seconds so that the polyurethane resin system in contact with the article is cured and becomes bonded to the article. The pressure is relieved and the temporary support peeled off to leave the label firmly bonded to the article surface.

The invention will now be further described, by way of example, with reference to the following examples.

A polyurethane resin suitable for producing a heat transfer may be prepared according to any one of preparations 1 to 3.

Preparation 1

A mixture of 850 g (1 mole) of hydroxyl poly (tetramethylene adipate) of molecular weight 850, hydroxyl number =130 and acid number =2, and 64.3 g (0.715 moles) of butanediol-1,4 is melted in a 4l kettle and stirred for about 20 minutes at a pressure of about 5 mm at 110° C. to dry the mixture 428 g (1.714 moles) of diphenylmethane-p,p'-diisocyanate is then added and the mixture stirred for 1 minute. This mixture is then poured into a 2.5l can precoated with a mould lubricant, and the lid is promptly closed. The can is then placed in an oven at 140° C. for 3½ hours. The product is then cooled, cut from the can and is then milled into thin sheets on a rubber mill at 130° C., and chopped into small pieces. In this form it is ready for use for making solutions for printing inks and lacquers.

Preparation 2

The above preparation method is used to make a polyurethane from: Hydroxyl poly(hexamethylene succinate) of molecular weight 950, hydroxyl number=114 acid number=4 ... 950 g (1 mole)

octamethylene glycol-1,8 ... 174 g (1.192 moles)

diphenyl dimethyl methane-p,p'-diisocyanate ... 609 g (2.191 moles)

Preparation 3

The above preparation method is used to make a polyurethane from: Hydroxyl poly(octamethylene sebacate) of molecular weight 938, hydroxyl No. 119, acid No. 1 ... 938 g (1 mole)

ethylene glycol ... 62.2 g (1 mole)

diphenylmethane-p,p'-diisocyanate ... 500 g (2 moles)

The very slight excess of glycol used is to ensure that the polymer end-groups will be hydroxyl and not isocyanate.

Each of the above resins is used in turn to prepare a stock solution by dissolving 20% of the resin in 80% of cyclohexanone. From this, the following printing inks are prepared, all percentages being by weight:

| 1. stock solution | 96.5% | 2. stock solution | 92.8% |
|---|---|---|---|
| hexamethoxymethyl melamine | 3% | cadmium red | 5% |
| | | tetramethoxymethyl urea | 2% |
| tartaric acid | 0.5% | citric acid | 0.2% |
| 3. stock solution | 94% | 4. stock solution | 93.5% |
| aluminium powder | 3% | hexamethoxymethyl melamine | 1% |
| butylated melamine precondensate | 2% | tartaric acid | 1.5% |
| | | phtholocyanine blue | 4% |
| phosphoric acid | 1% | | |

Further solutions may be prepared by substituting cross-linking agents and acids selected from the appropriate list. Inks are prepared by milling suitable pigments into stock solution, followed by the addition of the cross-linking agent and catalyst. Additions of conventional additives such as anti-foaming and anti-blocking agents may be made if desired.

EXAMPLE 1

A design is printed in mirror image form onto a film of "Melinex" 125 microns in thickness, using ink No. 2. Solution No. 1 is then printed in register with the ink to give a total print thickness of 50 microns.

EXAMPLE 2

A design is printed onto a laminate of cellulose triacetate and paper of total thickness 200 microns using ink No. 3. A circular area covering the design is then printed using ink No. 2. Solution No. 1 is then printed in register with ink No. 2, to bring the total thickness to 60 microns.

EXAMPLE 3

A laminate of 12 microns Melinex and 150 micron paper is printed with a rectangular area using solution No. 1. A design is then printed within the rectangle using ink No. 4 and a further layer of solution No. 1 is printed in register with the first to bring the total thickness to 70 microns.

A heated process with the platens at 200° C. and delivering a pressure of 0.1 Kg/cm$^2$ is used to apply the labels to garments made from cotton jersey, nylon jersey, knitted wool and crimped polyester. A time of 7 seconds was used and the temporary support was subsequently removed. The above procedure was then repeated but using an application pressure of 1 Kg/cm$^2$. All the applied labels withstood the natural stresses encountered during vigorous activity, and withstood repeated washing, dry cleaning and even direct ironing, and retained their stretch properties.

While the label as described is particularly suitable for use on stretch fabrics, such as knit wear and jersey, it may also be used on non-stretchy fabrics such as woven cotton.

TABLE 1

| Polyurethane No. | polyester | MW | moles | glycol | moles | combined average MW | diisocyanate | moles |
|---|---|---|---|---|---|---|---|---|
| 1 | A(i) | 600 | 1 | C(ii) | 0.24 | 500 | B(i) | 1.24 |
| 2 | " | 1,000 | 1 | " | 1.2 | 500 | " | 2.2 |
| 3 | " | 1,200 | 1 | " | 1.7 | 500 | B(ii) | 2.7 |
| 4 | " | 2,000 | 1 | " | 1.7 | 800 | B(i) | 2.7 |
| 5 | " | 2,500 | 1 | " | 1.6 | 1,000 | B(iii) | 2.6 |
| 6 | " | 3,000 | 1 | C(iv) | 1.7 | 1,2000 | B(iv) | 2.7 |
| 7 | " | 600 | 1 | " | 0.5 | 450 | B(v) | 1.5 |
| 8 | " | 1,200 | 1 | C(v) | 0.24 | 1,000 | B(vi) | 1.24 |
| 9 | " | 2,000 | 1 | C(iv) | 1.2 | 1,000 | B(vii) | 2.2 |
| 10 | " | 1,200 | 1 | C(i) | 1.1 | 600 | B(i) | 2.1 |
| 11 | A(ii) | 1,000 | 1 | C(ii) | 1.2 | 500 | " | 2.2 |
| 12 | " | 2,000 | 1 | C(ii) | 1.7 | 800 | " | 2.7 |
| 13 | A(iii) | 1,000 | 1 | " | 1.2 | 500 | " | 2.2 |
| 14 | " | 2,000 | 1 | " | 1.7 | 800 | " | 2.7 |
| 15 | A(iv) | 1,000 | 1 | " | 1.2 | 500 | " | 2.2 |
| 16 | " | 2,000 | 1 | " | 1.2 | 800 | " | 2.7 |
| 17 | A(i) | 1,200 | 1 | " | 2.1 | 450 | " | 3.1 |
| 18 | A(v) | 1,000 | 1 | " | 1.2 | 500 | " | 2.2 |
| 19 | " | 2,000 | 1 | " | 1.7 | 800 | " | 2.7 |

Additional examples of polyurethanes which may be used for producing heat transfers are those produced in accordance with Table I from the various polyesters, diisocyanates and glycols listed hereinbefore under the headings A-C. Such polyurethanes may be produced by a process similar to that used in Preparations 1 to 3.

Each of polyurethanes 1 to 19 was dissolved in cyclohexanone to give nineteen stock solutions each containing 20% by weight of the polyurethane and printing lacquers were subsequently prepared by the addition of 2% by weight hexamethoxymethyl melamine and 0.2% by weight citric acid to the stock solutions. Printing inks were then prepared by the additions to the printing lacquers of 10% by weight titanium dioxide, 6% by weight of cadmium red or 3% by weight of carbon black to give white, red or black inks respectively.

Transfers were then produced from the inks and printing lacquers by screen printing onto a laminate of paper and Melinex (Trade Mark for polyester film) which acts as a release coating, the whole laminate acting as a temporary support.

A single coloured heat transferable emblem is prepared by printing, in reverse, a character onto the temporary support using one of the inks and subsequently overlaying the character with a layer of the printing lacquer made from the same or different polyurethane as the ink so as to give a total thickness of about 50 microns. Multicolour transfers are prepared by printing the colours in sequence and finally overlaying the characters with a layer of printing lacquer to give a total thickness of approximately 50 microns.

The transfers thus produced were applied to a variety of textile fabrics, both woven and knitted, and including stretching fabrics using a heated press at 200° C. for 10 seconds at a pressure of 1 Kg/cm² and subsequently removing the temporary support.

The applied markings were tested by stretching, washing at various temperatures and ironing. All withstood washing below 60° C. while those prepared from a polyester with a molecular weight of 1200 to 3000 could withstand washing at temperatures up to boiling. To resistance to ironing and normal stretching, even after repeated washing and wearing was satisfactory.

What is claimed is:

1. A heat transfer comprising a temporary support and a label carried on said support, said label comprising a layer of a polyurethane resin system including
   (a) a thermoplastic polyurethane elastomer which is the product of the reaction of
      (1) 1 mole of an essentially linear hydroxyl terminated polyester either of the formula:

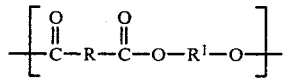

R is an alkylene radical of 2 to 8 carbon atoms and
R¹ is an alkylene radical of 4 to 10 carbon atoms, or of the formula:

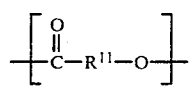

wherein:
R¹¹ is an alkylene radical of 4 to 8 carbon atoms, said linear polyester having an average molecular weight of 600 to 3000 and an acid number less than 10;
      (2) from 1.1 to 3.1 moles of diphenyl diisocyanate having an isocyanate group on each phenyl nucleus; and
      (3) from 0.1 to 2.1 moles of at least one free glycol of from 2 to 10 carbon atoms;
the combined average hydroxyl number molecular weight of the polyester and the free glycol being 450 to 1200, and the molar amount of the polyester and glycol combined being essentially equivalent to the molar amount of the diisocyanate compound;
   (b) an acid or acid yielding catalyst; and
   (c) as a cross-linking agent a compound containing at least two N-alkoxymethyl groups;
said layer of the polyurethane resin system being substantially noncross-linking at ambient temperatures with said polyurethane remaining uncured, and when the layer of the polyurethane resin system is placed in contact with an article to be marked and subjected to heat and pressure the polyurethane is rapidly cross-linked into an inert, insoluble, extensible and wear-resistant form to provide a substantially permanent marking on the article.

2. A heat transfer according to claim 1 wherein the polyester has 1 to 8 methylene groups per ester group.

3. A heat transfer according to claim 1, wherein the free glycol has the formula $HO(CH_2)_nOH$ wherein n is from 2 to 8.

4. A heat transfer according to claim 1 wherein the polyester has a molecular weight of 600 to 1200 and the combined average hydroxyl number molecular weight of the polyester and the free glycol is 450 to 600.

5. A heat transfer according to claim 1 wherein the polyester has a molecular weight of more than 1200 and at most 3000 and the combined average hydroxyl number molecular weight of the polyester and the free glycol is 450 to 1200.

6. A heat transfer according to claim 1 wherein the diphenyl diisocyanate is a diphenyl-p,p' - diisocyanate.

7. A heat transfer according to claim 1 wherein the diphenyl diisocyanate is a diphenyl methane diisocyanate.

8. A heat transfer according to claim 1, wherein the cross-linking agent is present in an amount of up to 30% by weight based on the weight of the dry resin.

9. A heat transfer according to claim 8, wherein the cross-linking agent is used in an amount of 5-20% by weight.

10. A heat transfer according to claim 1, wherein the N-alkoxymethyl groups are N-methoxymethyl groups.

11. A heat transfer according to claim 10, wherein the cross-linking agent is a methoxymethyl melamine compound.

12. A heat transfer according to claim 11, wherein the cross-linking agent is hexamethoxy methyl melamine.

13. A heat transfer according to claim 1 wherein the catalyst is a non-volatile acid having a pKa of from 2 to 5 or a compound yielding such an acid under the marking conditions.

14. A heat transfer according to claim 13, wherein the non-volatile acid has a pKa of from 2.5 to 3.5.

15. A heat transfer according to claim 13, wherein the acid is present in an amount of 0.5 to 10% by weight based on the dry weight of the resin.

16. A heat transfer according to claim 15, wherein the acid is used in an amount of 1 to 4% by weight based on the dry weight of the resin.

17. A heat transfer according to claim 13, wherein the acid is citric acid or tartaric acid.

18. A heat transfer according to claim 13, wherein the acid yielding compound is the ammonium salt or anhydride.

19. A heat transfer according to claim 1, wherein the label comprises a continuous layer of the polyurethane resin system and a marking based on the same or different polyurethane resin system carried by the continuous layer.

20. A heat transfer according to claim 1, wherein the label comprises two continuous layers of the same or different polyurethane resin system and a marking sandwiched there-between.

21. A heat transfer according to claim 20 wherein the marking is based on a polyurethane resin system.

22. A heat transfer according to claim 1 wherein the label comprises a marking, a background layer and a continuous unpigmented layer, all based on the same or different polyurethane resin system.

23. A heat transfer according to claim 1, wherein the label comprises a marking based on the polyurethane resin system and a layer of the same or different polyurethane resin system coterminous with, or slightly overlapping, the boundary edges of the marking for forming a bonding layer when the label is applied to an article.

24. A heat transfer according to claim 23, wherein the marking is sandwiched between two layers of the same or different polyurethane resin system, said layers being coterminous with, or slightly overlapping, the boundary edges of the marking.

25. An article marked with a heat transfer according to claim 1.

26. A heat transfer according to claim 1 wherein said layer of the polyurethane resin system may be cured within two to twenty seconds at a temperature between 150 and 250° C.

* * * * *